3,520,973
PROCESS FOR CONTROLLING INSECTS, NEMA-
TODES AND MITES USING VALINOMYCIN
Ernest Leonard Patterson, Pearl River, N.Y., and Donald
Perry Wright, Jr., Hopewell Township, Mercer County,
N.J., assignors to American Cyanamid Company, Stamford, Conn., a corporation of Maine
No Drawing. Filed Nov. 21, 1966, Ser. No. 595,619
Int. Cl. A61k 2/00; A01n 9/00, 17/00
U.S. Cl. 424—177                                      3 Claims

ABSTRACT OF THE DISCLOSURE

A process for controlling insects, nematodes and mites which comprises exposing said organisms to a composition containing an effective amount of valinomycin, not less than about 0.001%, and an inert carrier, whereby on contact a substantial number of the organisms are killed.

BACKGROUND OF THE INVENTION

The problem of compositions which are toxic to insects nematodes, mites etc., has involved at least two factors. The first, and in many respects the most important, is the toxicity of the active ingredient of the pesticidal composition for warm blooded animals, including man. Toxicity to humans can, of course, limit the utility of the pesticide and a secondary aspect is the undesirable effect on wild life such as birds who may eat insects, worms and the like that have become poisoned by the pesticide. Another aspect of the pesticide problem is that insects and other organisms to be killed may acquire relative immunity to the pesticide by developing resistant strains. This has been a serious factor in many pesticide compositions, including those of the chlorinated hydrocarbon type, which because of their lasting effect has caused injury to wildlife, and even the safe and more satisfactory pesticides of the organic phosphate type, such as for example malathion and the like.

SUMMARY OF THE INVENTION

According to the present invention it is found that pesticides having an effective amount of the cyclodepsipeptide valinomycin associated with the usual ingredients such as solvents, powders, dust and the like constitute improved compositions. Valinomycin has the following accepted formula:

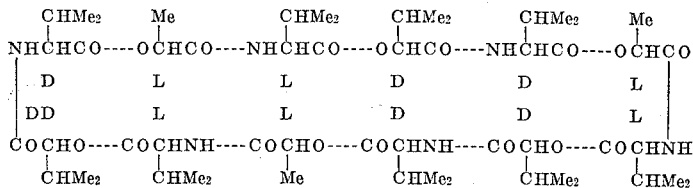

These compositions show an unexpectedly high degree of toxicity for insects, mites and nematodes with a low toxicity for warm blooded animals.

Valinomycin has been known as an antibiotic effective against various fungi and certain bacteria such as tubercle bacilli. That it also has high toxicity for the pests above referred to is very unusual in an antibiotic which normally acts only against much more primitive micro-organisms, primarily one celled organisms. It is not known why valinomycin has the high degree of pesticidal toxicity which ordinary antibiotics do not possess and therefore it is not desired to limit the invention by any particular theory of action. The compositions according to the present invention, containing valinomycin as their active ingredient associated with spray liquids, dusts and the like use in general the same types of carriers which have been effective with other pesticides. This is a practical advantage as the invention is not limited to particular or unusual carriers. Typical solid carriers, in addition to the conventional liquid sprays, include such finely divided materials as pumice, talc, attapulgite clay, vermiculite, diatomaceous earth, ground corn cobs and the like.

The activity of valinomycin as a pesticide is very high, concentrations as low as 0.001% being effective with certain pests and concentrations of 0.1% being effective against a large number of insects, nematodes and the like. It is a practical advantage of the invention that the toxicity seems to be about as high against strains of pests which have developed resistance to pesticides and therefore the present invention has the special property of being useful against these resistant strains.

As with many other pesticidal compositions, the compositions of the present invention may be made in higher concentrations such as 1 to 25% which are then diluted before use. When sprays are used the solvents may be water or organic solvents using conventional emulsifying agents, spreader-stickers, surface active agents, and the like. When solids are used as carriers they may be treated to be wettable with water and otherwise dispersible by addition of the conventional agents. In this respect the present invention does not differ from pesticidal compositions using other active ingredients and this is a practical advantage as no new techniques of formulation need be learned.

From the standpoint of pesticidal compositions it is immaterial what process is used for producing the valinomycin and conventional fermentations using the well known microorganism *Streptomyces fulvissimus* may be used. The valinomycin may be used in a pure state or a somewhat impure product may be utilized, the effectiveness of the pesticidal compositions being substantially unaffected by the relative purity of the valinomycin.

In addition to the pesticidal compositions, the present application includes also a new method of producing valinomycin utilizing *Streptomyces roseochromogenes*. In another aspect, therefore a new process for producing valinomycin is also included.

DESCRIPTION OF THE PREFERRED EMBODIMENTS

Example 1

To demonstrate the effectiveness of the composition of the subject invention for controlling insects, valinomycin is made up as a 0.1% solution in a 65/35 acetone/water mixture and applied as follows. Sieva lima bean leaves are dipped in the test solution and set in a hood to dry.

When dry, they are placed in petri dishes which have a moist filter paper in the bottom, and ten third-instar army worm larvae (*Prodenia eridania* Cram.), about ⅜ inch long, are added to each dish. The dishes are covered and held at 80° F. and 60% relative humidity for two days. At the end of this period, the dishes are examined and mortality counts and estimates of amount of feeding made.

With the subject material applied at 0.1% concentration, 100% control of army worms is achieved.

Example 2

The miticidal activity of valinomycin is demonstrated by the following tests wherein the composition is made up as 0.1%, 0.01%, 0.001%, and 0.0001% solutions in a 65/35 acetone-water mixture and applied to mite infested plants. Sieva lima bean plants with the first pair of leaves three to four inches in size are infested with two-spotted spider mites (*Tetranychus telarius* L.) about five hours before testing, using 100 to 200 adult mites per leaf. Some plants are infested with a susceptible strain of mites while others are infested with an organo-phosphate resistant strain. The infested leaves are dipped in the test solutions and the plants are placed in a hood to dry. The treated plants are held for two days at 80° F. and 60% relative humidity.

The adult mite mortality is calculated by counting dead and alive adults on one leaf under a ten-power binocular-scope. Another leaf is held an additional five days and then is examined under the ten-power lens to estimate the kill of eggs and newly-hatched nymphs.

It is found that one hundred percent kill is achieved against both susceptible and organophosphate resistant mites at 0.1%, 0.01%, concentration of valinomycin. It is also found that a kill of about fifty percent is achieved against both varieties of mites at 0.001% concentration. The material is as effective as commercial acaricides against the susceptible strain of mites and is especially useful since it is also effective against mites resistant to current type of acaricides.

Example 3

The testing procedure of Example 1 is repeated using Mexican bean beetle larvae as a test. 100% kill at a valinomycin concentration of 0.01% is obtained but there is no kill at a concentration of 0.001%.

Example 4

Inoculum preparation.—A typical medium used to grow the primary inoculum for the production of valinomycin is prepared according to the following formula:

| | Grams |
|---|---|
| Corn steep liquor | 20 |
| Sucrose | 30 |
| Ammonium sulfate | 2 |
| Calcium carbonate | 7 |

Water to 1000 milliliters.

A yeast-malt agar slant of *S. roseochromogenes* NRRL B-1233, deposited with the Culture Collection Laboratory, Northern Utilization Research and Development Division, United States Department of Agriculture, Peoria, Ill. and catalogued in its permanent collection under the above number, is incubated for a week after which time the spores and mycelium are transferred to ten 500 ml. flasks, each of which contains 100 ml. of the above medium. The flasks are placed on a reciprocating shaker and shaken vigorously for 48 hours, at 29° C.

Example 5

Fermentation.—A fermentation medium is prepared according to the following formula:

| | Grams |
|---|---|
| Corn steep liquor | 25 |
| Corn starch | 40 |
| Calcium carbonate | 5 |
| Lard oil | 2 |

Water to 1000 milliliters.

The fermentation medium is sterilized at 120° C. with steam at 15 pounds pressure for 45–60 minutes. The pH of the sterilized medium is about 6.8. Thirty liters of the sterile medium in a 40 liter tank fermenter are inoculated with one liter of an inocluum of *S. roseochromogenes* prepared as described above. The fermentation is carried out at 28° C. for 90 hours. The medium is agitated by an impeller operating at about 600 revolutions per minute, and aeration is supplied at the rate of 0.5 to 1.0 liter of sterile air per liter of broth per minute during this time.

Example 6

Isolation of crude valinomycin.—At the end of the fermentation period the pH of the fermented mash is adjusted to 6.5 and diatomaceous earth is added in the proportion of about 3 percent weight per volume. The mash is filtered, the filtrate discarded, and the mycelial cake is extracted with three separate seven liter portions of acetone. The spent cake is discarded and the ketone extracts are combined and concentrated to a aqueous dispersion having an approximate volume of 3 liters.

The aqueous dispersion thus obtained contains crude valinomycin and has pesticidal activity. Alternately, the purification procedure as described in the following example may be used on this aqueous dispersion to produce purified valinomycin.

Example 7

Isolation and purification and valinomycin.—As in Example 6, at the end of the fermentation period the pH of the fermented mash is adjusted to 6.5 and diatomaceous earth is added in the proportion of about 3 percent weight per volume. The mash is filtered, the filtrate discarded, and the mycelial cake is extracted with three separate seven liter portions of acetone. The spent cake is discarded and the acetone extracts are combined and concentrated to an aqueous dispersion having an approximate volume of 3 liters.

The aqueous dispersion, thereafter, is extracted with three separate 1500 milliliter portions of chloroform. The spent aqueous portion is discarded and the combined chloroform extracts are concentrated to an oil having a volume of 40 to 50 ml. This oil is then chromatographed on a silica gel column (500 g. silica gel in a 5.6 cm. diameter column), using 2500 ml. of petroleum ether, boiling point range 60–80° C., to elute impurities and subsequently 5000 ml. of ethyl acetate is used to elute the valinomycin. The ethyl acetate eluate is collected and concentrated to an oil and rechromatographed on an acid washed Florisil column (250 g. Florisil in a 3.8 cm. diameter column). The column is developed by first passing through 5000 ml. of petroleum ether and then 4000 ml. of a petroleum ether-ethyl acetate mixture in a 95:5 ratio. The latter eluate is collected and evaporated in vacuo to yield a residue of valinomycin which is further purified by recrystallization from a one to one mixture of acetone and hexane.

The process of preparing valinomycin has been described in conjunction with the strain NRRL B-1233. The invention is not limited to using the pure strain and includes the use of mutants of the microorganism such as, for example, those produced by X radiation, ultra-violet radiation, treatment with a nitrogen mustard, phage exposure and the like. Naturally occurring mutants are also useful.

What is claimed is:

1. A process for the control of insects, mites and nematodes which comprises exposing the organisms to a composition consisting essentially of an inert carrier and an effective insecticidal, acaricidal, and nematodicidal amount, respectively, of valinomycin, the amount being not less than about 0.001%.

2. A process according to claim 1 in which the inert carrier is a liquid.

3. A process according to claim 1 in which the inert carrier is a dust.

References Cited

Brown et al.: Antibotic Chemotherapy, 12, 1962, pp. 482–487.

Nishimura et al.: Journal of Antibotics, Ser. A, 17, 1964, pp. 11–22.

ALBERT T. MEYERS, Primary Examiner

D. M. STEPHENS, Assistant Examiner